United States Patent [19]

Mulholland

[11] Patent Number: 4,996,253

[45] Date of Patent: Feb. 26, 1991

[54] UV-LIGHT STABILIZED POLYOXYMETHYLENE MOLDING COMPOSITIONS

[75] Inventor: Bruce M. Mulholland, Union, Ky.

[73] Assignee: Hoechst Celanese Corporation, Somerville, N.J.

[21] Appl. No.: 269,408

[22] Filed: Nov. 10, 1988

[51] Int. Cl.$^5$ .................. C08K 5/3477; C08K 5/3492
[52] U.S. Cl. .................................... 524/91; 524/100; 524/101; 524/102
[58] Field of Search ................ 524/91, 101, 102, 100

[56] References Cited

U.S. PATENT DOCUMENTS

| | | | |
|---|---|---|---|
| 2,871,220 | 1/1959 | MacDonald | 525/398 |
| 3,000,853 | 9/1961 | Havens | 524/343 |
| 3,219,621 | 11/1965 | Prichard | 524/343 |
| 3,219,623 | 11/1965 | Berardinelli | 524/343 |
| 3,480,694 | 11/1969 | Moncure | 525/400 |
| 3,626,024 | 12/1971 | Gutweller et al. | 525/399 |
| 3,763,093 | 10/1973 | Kletecka et al. | 524/101 |
| 4,385,143 | 5/1983 | Yachigo et al. | 524/101 |
| 4,446,263 | 5/1984 | Bryant | 524/343 |
| 4,547,548 | 10/1985 | Cantatore | 525/400 |
| 4,689,373 | 8/1987 | Auerbach et al. | 525/398 |
| 4,758,608 | 7/1988 | Collins et al. | 525/398 |

*Primary Examiner*—Kriellion Morgan
*Attorney, Agent, or Firm*—Nixon & Vanderhye

[57] ABSTRACT

A polyoxymethylene composition which exhibits improved stability against the degradative effects of ultraviolet light includes a triazine-based antioxidant and UV stabilizers. One preferred composition of the invention includes, based upon the total weight of the composition, an oxymethylene copolymer, between 0.015 to about 0.4 weight percent of 2,4,6-triamino-sym-triazine (as a formaldehyde scavenger), between about 0.25 to about 1.0 weight percent of each of 2-2(hydroxy-5-t-octylphenyl) benzotriazole, and bis(2,2,6,6-tetramethyl-4-piperidinyl)sebacate as UV light stabilizers, and between about 0.25 to about 1.0 weight percent of 3,5-di-tert-butyl-4-hydroxyhydrocinnamic acid triester with 1,3,5-tris(2-hydroxy-ethyl)-s-triazine-2,4,6-(1H, 3H, 5H)-trione as an antioxidant. Due to their enchanced UV-light stability property, the compositions of the invention find particular utility as molded automobile components.

20 Claims, No Drawings

UV-LIGHT STABILIZED POLYOXYMETHYLENE MOLDING COMPOSITIONS

FIELD OF THE INVENTION.

The present invention relates generally to molding compositions of polyoxymethylene. More specifically, the invention is related to polyoxymethylene molding compositions which exhibit improved ultraviolet light stability.

BACKGROUND OF THE INVENTION

Polyoxymethylene is well known for its propensity to physically degrade when exposed to ultraviolet (UV) light for long periods of time. This degradative effect of UV light on polyoxymethylene impairs its toughness and flexibility as well as promoting discoloration. Toughness and color retention are necessary criteria when polyoxymethylene compositions are employed in automotive applications (e.g., automotive interior components).

In addition to the requirements of toughness and color retention, any successful polyoxymethylene composition must also exhibit desirable processability characteristics. That is, during molding of parts, the composition must be capable of releasing easily from the mold without forming significant amounts of mold deposits. Otherwise, the molded part itself may not be useable due to improper and/or inconsistent part surfaces or unacceptably high surface gloss levels (particularly where parts having low surface gloss levels are desired).

It is known from U.S. Pat. No. 3,219,621 to Prichard et al issued Nov. 23, 1965 (the entire content of which is incorporated expressly hereinto by reference) that the susceptibility of oxymethylene polymers to "weathering" (including discoloration due to exposure to UV light) without undue decrease in thermal stability can be reduced by the addition of 2-hydroxy benzophenone to a polyoxymethylene polymer wherein the polymer units are derived from cyclic ethers having at least two adjacent carbon atoms.

It is also known that molding compositions of oxymethylene copolymers (i.e., having at least one chain containing from about 85 to 99.6 mole percent of oxymethylene units interspersed with about 0.4 to 15 mole percent of oxyethylene units) can be rendered less susceptible to the degradative effects of UV light by incorporating in the composition between 0.1 to 1.0 percent by weight of 1,6-hexamethylene bis-(3,5-di-tert-butyl)-4 hydroxy hydrocinnamate, about 0.015 to 0.4 percent by weight of 2,4,6-triamino-sym-triazine, about 0.1 to 0.75 percent by weight of bis(1,2,2,6,6-pentamethyl-4-piperidinyl) (3,5-bis(1,1-dimethylethyl-4-hydroxyphenol)methyl))butyl propanedioate and about 0.25 to 1.0 percent by weight of 2-hydroxy-4-n-octoxybenzophenone. In this regard, see U.S. Pat. No. 4,446,263 issued to Walter R. Bryant on May 1, 1984, the entire content of which is expressly incorporated hereinto by reference.

While the above-noted polyoxymethylene formulations do provide enhancement against the degradative effects of UV light, additional improvements in this regard are still needed. Thus, it is towards achieving improvements to UV-light stabilized polyoxymethylene compositions that the present invention is directed.

SUMMARY OF THE INVENTION

Broadly, the present invention is a polyoxymethylene molding composition which includes a sterically hindered phenolic antioxidant with triazine functionality. More specifically, the compositions of the present invention include polyoxymethylene and a triazine-based antioxidant of the formula:

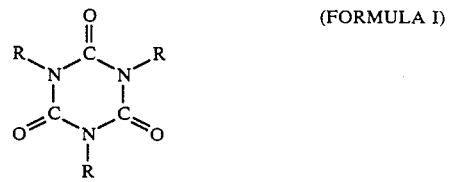
(FORMULA I)

where each R is a phenolic group attached to the triazine ring via a C1 to C5 alkyl or an ester substituent. Preferably, each R is one selected from the group consisting of:

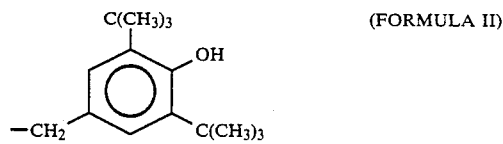
(FORMULA II)

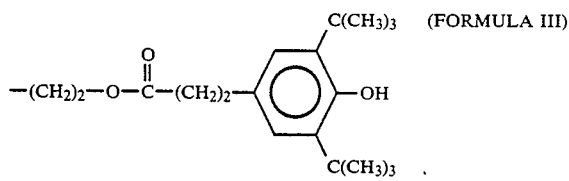
(FORMULA III)

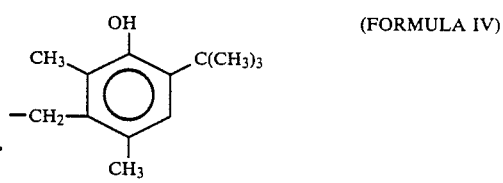
(FORMULA IV)

Preferably the compositions of the present invention will also include other components, for example, known UV light stabilizers and antioxidants, as well as fillers and/or reinforcing agents (i.e., depending upon the end use application).

The compositions of this invention exhibit excellent weatherability, particularly stabilization against UV light degradation, and moreover, are easily processable without undesirable mold deposits being formed. Hence, the compositions of this invention find particular utility in automotive interior parts, for example. Of course, the compositions of this invention may be employed in any end use environment where UV light stabilization characteristics are desirable in conjunction with the physical properties of polyoxymethylene.

These advantages, and others, will become more apparent from the detailed description of the compositions according to the present invention which follows.

DETAILED DESCRIPTION OF THE PREFERRED EXEMPLARY EMBODIMENTS

Surprising, by employing the additives as will be described below, polyoxymethylene is rendered resistant to weathering, and more particularly, is rendered resistant to degradation by UV light.

A preferred group of polymers intended to be utilized in accordance with this invention are oxymethylenecyclic ether copolymers having a structure comprising recurring units having formula

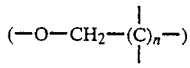

wherein n is an integer from zero to 5 and wherein n is zero in 60 to 99.6 percent of the recurring units.

A preferred class of copolymers are those having a structure comprising recurring units having the formula (—O—CH$_2$—(CH$_2$)n—) wherein n is an integer from zero to 2 and wherein n is zero in 60 to 99.6 percent of the recurring units. These copolymers are prepared by copolymerizing trioxane with a cyclic ether having the structure.

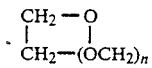

where n is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulfur is the donor atom. The coordination complexes of boron fluoride may, for example, be a complex with a phenol, an ether, an ester, or a dialkyl sulfide. Boron fluoride dibutyl etherate, the coordination complex of boron fluoride with dibutyl ether, is the preferred coordination complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordination complex of boron fluoride should be present in the polymerization zone in amounts such that its boron fluoride content is between about 0.0001 and about 1.0 weight percent based on the weight of the monomers in the polymerization zone. Preferably, amounts between about 0.003 and about 0.03 weight percent should be used in a continuous process.

The preferred catalyst used in preparing the oxymethylene copolymer is the aforementioned boron trifluoride as discussed in U.S. Pat. No. 3,027,352 issued to Walling et al, herein incorporated by reference. Reference may be made to this patent for further information concerning the polymerization conditions, amount of catalyst employed, etc.

The monomers in the reaction zone are preferably anhydrous or substantially anhydrous. Small amounts of moisture, such as may be present in commercial grade reactants or may be introduced by contact with atmospheric air, will not prevent polymerization but should be essentially removed for optimum yields.

As a specific example, the trioxane, cyclic ether and catalyst may be dissolved in a common anhydrous solvent, such as cyclohexane and permitted to react in a sealed reaction zone. The temperature in the reaction zone may vary from about 0° C. to about 100° C. The period of reaction may vary from about 5 minutes to about 72 hours. Pressures from subatmospheric to about 100 atmospheres, or more may be used, although atmospheric pressure is preferred.

Relatively minor amounts of the cyclic ether other than trioxane used in the copolymerization reaction generally disappear completely from the reaction mixture. The required ratio of trioxane to cyclic ether in the reaction mixture may therefore be roughly predetermined for a desired mole ratio in the polymer by assuming that all of the cyclic ether is used up and by assuming a particular conversion level from previous experience under substantially comparable conditions.

The chemical constitution of the cyclic ether must also be considered. Thus, 1,3-dioxolane contains both an oxymethylene group and a oxyethylene group. Its incorporation into the copolymer molecule introduces oxyethylene groups into the polymer molecule.

In general, the cyclic ether is present in the reaction mixture in the amounts between about 0.2 and about 30 mole percent, based on the total moles of monomer. The optimum proportion will depend on the particular copolymer desired, the expected degree of conversion and the chemical constitution o the cyclic ether used.

The copolymer produced from the preferred cyclic ethers in accordance with this invention have a structure substantially comprised of oxymethylene and oxyethylene groups in a ratio from about 1000:1 to about 6:1, preferably 250:1 to 1.5:1.

Upon completion of the polymerization reaction, it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of the methods of neutralizing catalyst activity may be found in U.S. Pat. No. 2,989,509 of Hudgin et al. A preferred oxymethylene copolymer is commercially available from Hoechst Celanese Corporation under the designation Celcon ® acetal copolymer.

The oxymethylene coplymers that are employed in the present invention are thermoplastic materials having a melting point of at least 150° C., and normally are millable or processable at a temperature of about 200° C. They have a number average molecular weight of at least 10,000. The preferred oxymethylene polymers have an inherent viscosity of at least 1.0 (measured at 60° C. in a 0.1 weight percent solution in p-chlorophenol containing 2 weight percent of alpha-pinene).

The oxymethylene copolymer component preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in commonlyassigned U.S. Pat. No. 3,219,623 issued to Beradinelli, herein incorporated by reference.

If desired, the oxymethylene copolymer may be endcapped by techniques known to those skilled in the art. A preferred end-capping technique is accomplished by acetylation with acetic anhydride in the presence of sodium acetate catalyst.

The additives which can be successfully employed in the practice of this invention may be generally classified as antioxidants, UV stabilizers, free radical scavengers and other additives (e.g., lubricants, fillers, reinforcing agents, colorants and the like).

The triazine-based antioxidant may be present in the compositions of this invention in an amount of between about 0.25 to 1.0 weight percent (based on the total weight of the composition), and preferably between about 0.4 to about 0.6 weight percent.

The triazine-based antioxidants which may be successfully employed in the present invention are commercially available. For example, a triazine-based antioxidant, where each R in Formula I is represented by the Formula II is commercially available from Ciba-Geigy under the tradename Irganox 3114. Similarly, a triazine-based antioxidant, where each R in Formula I is represented by the Formula IV is commercially available from American Cyanamid under the tradename Cyanox ® 1790.

However, particularly preferred for the compositions of this invention is the triazine-based antioxidant where each R in the Formula I is represented by the Formula III—that is, 3,5-di-tert-butyl-4-hydroxyhydrocinnamic acid triester with 1,3,5-tris(2-hydroxethyl)-s-triazine-2,4,6(1H, 3H, 5H)-trione. Such a compound is commercially available from Ciba-Geigy under the tradename Irganox 3125.

The UV light stabilizer is preferably present in the composition in an amount not greater than about 2.0 weight percent, and preferably, not greater than about 1.0 weight percent (based upon the total weight of the composition). More than one UV light stabilizer may be (and preferably is) present in the polyoxmethylene compositions of this invention. For example, it is particularly preferred that the compositions of the present invention include substantially equal weight percentages based upon the total weight of the composition) of 2-(2-hydroxy-5-t-octylphenyl)-benzotriazole (commercially available from Cyanamid Company under the tradename Cyasorb ® UV 5411) and bis(2,2,6,6-tetramethyl-4-piperidinyl)sebacate (commercially available from Ciba-Geigy under the tradename Tinuvin 770).

A free formaldehyde scavenger is also preferably present in the compositions of this invention. One particularly suitable free formaldehyde scavenger is 2,4,6-triamino-symtriazine commercially available from American Cyanamid. The free formaldehyde scavenger will be present in the composition in an amount between about 0.015 to about 0.4 weight percent (based upon the total weight of the composition), and more preferably in an amount between about 0.015 to about 0.045 weight percent.

Polyoxymethylene compositions which generally include UV light stabilizers (i.e., 2-(3',5'-bis(l-methyl-l-phenylethyl)-2'-hydroxypheny-1)-benzotriazole and bis(2,2,6,6-tetramethyl-4-piperidinyl)sebacate in substantially equal weight percentages) and 2,4,6-triamino-sym-triazine as a formaldehyde scavenger, but with tetrakis(methylene(3,5-di-tert-butyl-4-hydroxyhydrocinnamate) methane as an antioxidant have been commercially available for some time from Polyplastics Co., Ltd. of Tokyo, Japan, under the product designation Duracon M90-36.

Surprisingly, it has been found that by substituting the triazine-based antioxidants as above described (particularly the triazine-based antioxidant of Formula I, where each R is represented by the Formula III) for the tetrakis(methylene(3,5-di-tert-butyl-4-hydroxyhydrocinnamate))methane of the prior art composition, enhanced UV light stabilization properties ensue. For example, whereas the Duracon M90-36 product of Polyplastics, Co., Ltd. does promote UV light stabilization of polyoxymethylene, as will be demonstrated below, it is significantly outside the color difference requirements for the stringent requirements of SAE (Society of Automotive Engineers) Standard J1885. The compositions of the present invention, however, exhibit significantly less color difference (i.e., less than about 3.5), as calculated in CIELab units under illuminant "D-65" according to ASTM Standard D-2244, when exposed to 1240.8 Kj/sq.m irradiation in a Xenon arc weather-ometer when operated according SAE J1885.

One particularly preferred composition according to this invention comprises, based upon the total weight of the composition, greater than about 95 weight percent of polyoxymethylene, between about 0.015 to about 0.4 weight percent (preferably about 0.03 weight percent) of 2,4,6-triamino-symtriazine, between about 0.25 to about 1.0 weight percent (preferably about 0.5 weight percent) of each of 2-(2-hydroxy-5-t-octylphenyl)-benzotriazole, bis(2,2,6,6-tetramethyl-4-piperidinyl)sebacate, and 3,5-di-tert-butyl-4-hydroxyhydrocinnamic acid triester with 1,3,5-tris (2-hydroxyethyl)-s-triazine-2,4,6(1H, 3H, 5H)-trione (i.e., the triazine-based antioxidant of Formula I, where each R is represented by the Formula III).

Blends of the present invention may include approximately 1 to 50 percent by weight (based upon the total weight of the composition) of filler materials. Representative filler materials include calcium carbonate, calcium silicate, silica, clays, talc, mica, polytetrafluoroethylene, graphite, alumina, trihydrate, sodium aluminum carbonate, barium ferrite, pigments, etcetera.

Approximately 1 to 60 weight percent, (based upon the total weight of the composition) of reinforcing agents may also be blended with the compositions of this invention. Specific examples of such reinforcing materials include glass fibers, graphitic carbon fibers, amorphous carbon fibers, synthetic polymeric fibers, aluminum fibers, titanium fibers, steel fibers, tungsten fibers, and ceramic fibers, to name just a few.

The additives may be mixed with the polyoxymethylene in any expedient fashion. For example, the additives and polyoxymethylene may be mixed by dry-blending in a high intensity mixer followed by melt extrusion and pelletizing; by milling between two heated rolls and chopping into molding granules; or by milling in Banbury mixer or Brabender Plastograph.

The invention will be further illustrated by way of the following Example, which are to be considered to be illustrative only, and non-limiting.

EXAMPLES

Polyoxymethylene molding compositions were prepared comprised of a polyacetal molding resin commercially available from Hoechst Celanese Corporation under the tradename Celcon ®. The compositions included various additives to determine the effect of such additives upon the weathering and UV stability of the molding compositions, with the following additives being employed in various combinations:

A. Antioxidants tetrakis(methylene(3,5-di-tert-butyl-4-hydroxyhydrocinnamate))methane - Ciba Geigy, Irganox 1010.
1,2-bis(3,5-di-tert-butyl-4-hydroxyhydrocinnamoyl)-hydrazine - Ciba Geigy, Irganox MD1024
triethyleneglycol bis(3-(3'-tert-butyl-4'-hydroxy-5'-methylphenyl) propionate) - Ciba Geigy, Irganox 245
3,5-di-tert-butyl-4-hydroxyhydrocinnamic acid triester with 1,3,5-tris(2-hydroxyethyl)-s-triazine-2,4,6(1H, 3H, 5H)-trione - Ciba-Geigy, Irganox 3125

B. UV Stabilizers bis(2,2,6,6-tetramethyl-4-piperidinyl)sebacate - Ciba-Geigy, Tinuvin 770
2-(2-hydroxy-5-t-octylphenyl)-benzotriazole - Cyanamid, Cyasorb® UV 5411

C. Formaldehyde Scavenger 2,4,6-triamino-sym-triazine - American Cyanamid melamine D. Other Additives calcium 12-hydroxystearate as acid scavenger commercially available from Kosei Co., LTD. (noted below as Ca 12-OHStearate)
N-N'-ethylenebisstearamide as a lubricant commercially available from Glycol, Inc. under the tradename Acrawax C
ethoxylated fatty acid as a surface modifying agent commercially available from Protameen Chemicals under the tradename Protamate 200 DPS

EXAMPLE 1

Polyacetal molding compositions were prepared by preblending virgin acetal copolymer with stabilizers and colorants according to the formulations presented in Table I, in a high intensity mixer. The dry blend was extruded on a single-screw extruder at 195° C. and 100 rpm, and pelletized. The pelletized samples were then injection molded into test plaques on a reciprocating screw machine at 195° C.

The test plaques of the resin formulations were exposed to ultraviolet light and heat in a Xenon arc weatherometer, operated according to automotive test procedure SAE J1885. The primary conditions of the test are as follows:

|  | Light Cycle | Dark Cycle |
| --- | --- | --- |
| Irradiance, W/m² | 0.55 | — |
| Black Panel Temp., °C. | 89 | 38 |
| Relative Humidity, % | 50 | 100 |
| Cycle Time, hr. | 3.8 | 1.0 |

The Xenon arc weatherometer is of the water-cooled, controlled irradiance type. Amount of exposure is measured in terms of the total irradiation the test plaques receive, expressed in kilojoules per square meter. The degree of color change is determined by instrumentally measuring the color of exposed specimens versus the unexposed specimens. The degree of color change is quantified as the total color difference (Delta E), calculated for illuminant "D-65", 10-degree observer, expressed in CIELab units, in accordance with ASTM D-224. Samples are measured at various increments of irradiation accumulated by the test plaques.

The results of such tests are listed below in the following Tables.

TABLE I

|  | E1 | CE1 | CE2 | CE3 |
| --- | --- | --- | --- | --- |
| Acetal Copolymer | 96.53 | 96.53 | 96.53 | 96.53 |
| Acrawax C | 0.18 | 0.18 | 0.18 | 0.18 |
| Formaldehyde Scavenger | 0.03 | 0.03 | 0.03 | 0.03 |
| Ca12-OH-Stearate | 0.10 | 0.10 | 0.10 | 0.10 |
| Cyasorb UV5411 | 0.50 | 0.50 | 0.50 | 0.50 |
| Tinuvin 770 | 0.50 | 0.50 | 0.50 | 0.50 |
| Protamate 200-DPS | 0.50 | 0.50 | 0.50 | 0.50 |
| Colorants* | 1.16 | 1.16 | 1.16 | 1.16 |
| Irganox 3125 | 0.50 |  |  |  |
| Irganox 1010 |  | 0.50 | 0.25 |  |
| Irganox MD1024 |  |  | 0.25 |  |
| Irganox 245 |  |  |  | 0.50 |

*General Motors Corp. "Garnet Red" (WPH-8781)

TABLE II

| COMPOSITION | COLOR DIFFERENCE[1] |
| --- | --- |
| E1 | 3.2 |
| CE1 | 6.6 |
| CE2 | 5.4 |
| CE3 | 9.6 |

[1]Color difference calculated in CIE Lab Units, under illuminant "D-65", for samples exposed to 1240.8 Kj/sq.m irradiation in a Xenon arc weather-ometer, operated according to SAE J1885.

EXAMPLE 2

Example 1 was repeated using a commercial grade UV-stable acetal copolymer (Duracon M90-36, Polyplastics Co., Ltd.). A color difference, as calculated in CIELab units, of 10.0 was obtained, when a test plaque of the acetal copolymer was exposed to 1240.8 Kj/sq.m irradiation in a Xenon arc weather-ometer (illuminant "D-65" according to ASTM Standard D-2244) operated according to SAE J1885.

EXAMPLE 3

The sample preparation and testing of Example 1 above was repeated using colorants so as to achieve the four typical automotive colors identified below in Tables III-VI. Resins tested included a composition of this invention (i.e., the formulation identified in Table I above as "E1"); a composition of U.S. Pat. No. 4,446,263 (commercially available from Hoechst Celanese Corporation under the tradename Celcon® UV90); and a commercial grade UV-stable acetal homopolymer (Delrin® II 517, E. I. DuPont). The results appear in Tables III-VI below wherein the color difference for each sample tested was calculated in CIELab units, under illuminant "D-65", for samples exposed to 1240.8 Kj/sq.m irradiation in a Xenon arc weather-ometer, operated according to SAE J1885.

TABLE III

| Color: General Motors Garnet Red (WPH-8781) | |
| --- | --- |
| COMPOSITION | COLOR DIFFERENCE |
| E1 | 3.2 |
| Celcon ® UV90 | 15.9 |
| Delrin ® II 517 | 16.6 |

TABLE IV

| Color: General Motors Medium Beechwood (WPH-9098) | |
|---|---|
| COMPOSITION | COLOR DIFFERENCE |
| E1 | 0.6 |
| Celcon ® UV90 | 10.1 |
| Delrin ® II 517 | 7.0 |

TABLE V

| Color: General Motors Very Dark Sapphire (WPH-8841) | |
|---|---|
| COMPOSITION | COLOR DIFFERENCE |
| E1 | 1.5 |
| Celcon ® UV90 | 8.0 |
| Delrin ® II 517 | 13.6 |

TABLE VI

| Color: General Motors Medium Slate Gray (WPH-9230) | |
|---|---|
| COMPOSITION | COLOR DIFFERENCE |
| E1 | 1.5 |
| Celcon ® UV90 | 5.3 |

The above data demonstrate the effectiveness of employing a triazine-based antioxidant and UV-stabilizers in the polyoxymethylene molding compositions of this invention. Therefore, while the invention has been described in connection with what is presently considered to be the most practical and preferred embodiment, it is to be understood that the invention is not to be limited to the disclosed embodiment, but on the contrary, is intended to cover various modifications and equivalent compositions included within the spirit and scope of the appended claims.

What is claimed is:

1. A molding composition exhibiting ultraviolet light stability comprising, based on the total weight of the composition:
   (a) an oxymethylene copolymer;
   (b) between about 0.015 to about 0.4 percent by weight of 2,4,6-triamino-sym-triazine;
   (c) between about 0.25 to about 1.0 percent by weight of 2-(2-hydroxy-5-t-octylphenyl)-benzotriazole;
   (d) between about 0.25 to about 1.0 percent by weight of 3,5-di-tert-butyl-4-hydroxyhydrocinnamic acid triester with 1,3,5-tris(2-hydroxyethyl)-s-triazine-2,4,6(1H, 3H, 5H)-trione; and
   (e) between about 0.25 to about 1.0 percent by weight of bis(2,2,6,6-tetramethyl-4-piperdinyl)sebacate; wherein
   (f) said composition exhibits a color difference, as calculated in CIELab units under illuminant "D-65" according to ASTM Standard D-2244, of less than about 3.5 when exposed to 1240.8 Kj/sq.m irradiation in a Xenon arc weatherometer operated according to SAE J1885.

2. A molding composition as in claim 1 wherein said component (a) is present in an amount greater than about 9.5 weight percent.

3. A molding composition as in claim 2 wherein said component (a) has a melting point of at least about 150° C. and at least one chain containing from about 85 to 99.6 mole percent of oxymethylene units interspersed with about 0.4 to 15 mol percent of oxyethylene units.

4. A molding composition as in claim 1 wherein said component (b) is present in an amount of about 0.03 weight percent.

5. A molding composition as in claim 1 wherein said component (c) is present in an amount of between about 0.4 to about 0.6 weight percent.

6. A molding composition as in claim 1 wherein said component (d) is present in an amount of about 0.4 to about 0.6 weight percent.

7. A molding composition as in claim 1 wherein said component (e) is present in an amount of about 0.4 to about 0.6 weight percent.

8. A molding composition as in claim 1 wherein each of said components (c), (d) and (e) is present in an amount of about 0.5 weight percent.

9. A molding composition as in claim 1 which further comprises at least one component selected from fillers, colorants and reinforcing agents.

10. A molded automotive part capable of meeting SAE Standard J1885 and consisting essentially of the composition of claim 1.

11. A molded part having improved UV-light stability such that said molded part exhibits a color difference, as calculated in CIELab units under illuminant "D-65" according to ASTM Standard D-2244, of less than about 3.5 when exposed to 1240.8 Kj/sq.m irradiation in a Xenon arc weathermeter operated according to SAE J1885, said molded part consisting essentially of a composition which comprises the following components, based upon the total weight of the composition:
   (a) an oxymethylene copolymer;
   (b) between about 0.015 to about 0.4 percent by weight of 2,4,6-triamino-sym-triazine;
   (c) between about 0.25 to about 1.0 percent by weight of 2-(2-hydroxy-5-t-octylphenyl)-benzotriazole;
   (d) between about 0.25 to about 1.0 percent by weight of 3,5-di-tert-butyl-4-hydroxyhydrocinnamic acid triester with 1,3,5-tris(2-hydroxyethyl)-s-triazine-2,4,6(1H, 3H, 5H)-trione; and
   (e) between about 0.25 to about 1.0 percent by weight of bis(2,2,6,6-tetramethyl-4-piperdinyl)sebacate.

12. A molded part as in claim 11 wherein said component (a) is present in an amount greater than about 95 weight percent.

13. A molded part as in claim 12 wherein said component (a) has a melting point of at least about 150° C. and at least one chain containing from about 85 to 99.6 mole percent of oxymethylene units interspersed with about 0.4 to 15 mol percent of oxyethylene units.

14. A molded part as in claim 11, wherein said component (b) is present in an amount of about 0.03 weight percent.

15. A molded part as in claim 11 wherein said component (c) is present in an amount of between about 0.4 to about 0.6 weight percent.

16. A molded part as in claim 11 wherein said component (d) is present in an amount of about 0.4 to about 0.6 weight percent.

17. A molded part as in claim 11 wherein said component (e) is present in an amount of about 0.4 to about 0.6 weight percent.

18. A molded part as in claim 11 wherein each of said components (c), (d) and (e) is present in an amount of about 0.5 weight percent.

19. A molded part as in claim 11, which further comprises at least one component selected from fillers, colorants and reinforcing agents.

20. A molded part as in claim 11, which further includes a colorant in an amount effective to achieve a desired color for said molded part.

* * * * *

UNITED STATES PATENT AND TRADEMARK OFFICE
CERTIFICATE OF CORRECTION

PATENT NO. : 4,996,253

DATED : February 26, 1991

INVENTOR(S) : Bruce M. MULHOLLAND

It is certified that error appears in the above-identified patent and that said Letters Patent is hereby corrected as shown below:

Column 2, line 66, delete "Surprising" and insert --Surprisingly--.

Column 3, line 6, after "having" insert --the-- and after "formula" insert --:--;
    line 21, after "structure" delete the period (.) and insert --:--.

Column 4, line 21, after "and" delete "a" and insert --an--;
    line 29, after "constitution" delete "o" and insert --of--.

Signed and Sealed this

Third Day of November, 1992

Attest:

DOUGLAS B. COMER

Attesting Officer          Acting Commissioner of Patents and Trademarks